(12) United States Patent
Martin et al.

(10) Patent No.: US 12,691,839 B2
(45) Date of Patent: Jul. 28, 2026

(54) COMBINED AIR FITTING

(71) Applicant: Rivian IP Holdings, LLC, Plymouth, MI (US)

(72) Inventors: Rex Christopher Martin, Los Angeles, CA (US); Michal Jan Holcer, Mission Viejo, CA (US); Austin Simpson, Huntington Beach, CA (US); Jonathan David Salerno, Newport, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 675 days.

(21) Appl. No.: 18/147,332

(22) Filed: Dec. 28, 2022

(65) Prior Publication Data

US 2024/0217465 A1 Jul. 4, 2024

(51) Int. Cl.
 B60R 16/08 (2006.01)
 F16L 37/56 (2006.01)
(52) U.S. Cl.
 CPC ............ B60R 16/08 (2013.01); F16L 37/565 (2013.01); *F16L 2201/00* (2013.01)
(58) Field of Classification Search
 CPC ...... B60R 16/08; F16L 37/565; F16L 2201/00
 See application file for complete search history.

(56) References Cited

U.S. PATENT DOCUMENTS

| | | | | |
|---|---|---|---|---|
| 6,067,850 A * | 5/2000 | Lang | ...................... | G01L 17/00 |
| | | | | 702/140 |
| 7,926,521 B2 * | 4/2011 | Izumoto | .................. | B60S 5/046 |
| | | | | 141/105 |
| 8,251,105 B2 * | 8/2012 | Lolli | ...................... | B60S 5/046 |
| | | | | 141/351 |

FOREIGN PATENT DOCUMENTS

| | | | | | |
|---|---|---|---|---|---|
| CN | 203681926 U | * | 7/2014 | | |
| JP | 2004211721 A | * | 7/2004 | | |
| JP | 2019138610 A | * | 8/2019 | | |
| JP | 2019179762 A | * | 10/2019 | | |
| KR | 200425634 Y1 | * | 9/2006 | ............. | B60S 3/042 |
| KR | 102076987 B1 | * | 4/2020 | ............. | A62C 35/68 |

* cited by examiner

*Primary Examiner* — Angelisa L. Hicks
(74) *Attorney, Agent, or Firm* — Foley & Lardner LLP

(57) ABSTRACT

An apparatus can include a fluid access assembly. The fluid access assembly can include a first fluid access configured to pass first fluid with a first fluid pressure. The fluid access assembly can include a second fluid access configured to pass second fluid with a second fluid pressure. The first fluid pressure can be greater than the second fluid pressure. The first fluid access can be concentric with the second a fluid ir access.

12 Claims, 14 Drawing Sheets

405
Operating
Position

410
Pressure Release
Position

415
Hose Release
Postion

700

725

720

710

705

715

1200

1205 — Provide fluid control system

1300

COMBINED AIR FITTING

INTRODUCTION

Air systems can provide air or remove air for different purposes.

SUMMARY

Conventionally, separate air systems that are used to provide high pressure (HP) air and low pressure (LP) air require separate connections or access points based on the air pressure that is needed. The technical solution described herein provides a combined air system that can provide HP and LP air via an access point. For example, the access point can include a first air access that provides HP air and a second air access that provides LP air. The first air access has a first shape (e.g., an opening) that is concentric with a second shape (e.g., an opening) of the second air access. The single access point can include a release mechanism that allows easy and quick release a hose detachably coupled to the connection point. Using an access point to provide both HP and LP air reduces the space that is occupied by the otherwise various access points and simplifies the process of determining which access point to connect a hose to for which task.

At least one aspect is directed to an apparatus. The apparatus can include an air access assembly. The air access assembly can include a first air access configured to pass first air with a first air pressure. The air access assembly can include a second air access configured to pass second air with a second air pressure. The first air pressure can be greater than the second air pressure. The first air access can be concentric with the second air access.

At least one aspect is directed to a method. The method can include providing an air access assembly. The air access assembly can include a first air access to pass first air with a first air pressure. The air access assembly can include a second air access to pass second air with a second air pressure. The first air pressure can be greater than the second air pressure. The first air access can be concentric with the second air access.

At least one aspect is directed to an electric vehicle. The electric vehicle can include a fluid control system. The fluid control system can include an air access assembly. The air access assembly can include a first air access configured to pass first air with a first air pressure. The air access assembly can include a second air access configured to pass second air with a second air pressure. The first air pressure can be greater than the second air pressure. The first air access can be concentric with the second air access.

At least one aspect is directed to a method. The method can include moving a member of an air access assembly linearly in a first direction. The method can include releasing a pressure applied to a hose coupled with the air access assembly. The method can include moving the member linearly in at least one of the first direction and a second direction. The second direction can be opposite the first direction. The method can include disconnecting the hose from the air access assembly.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
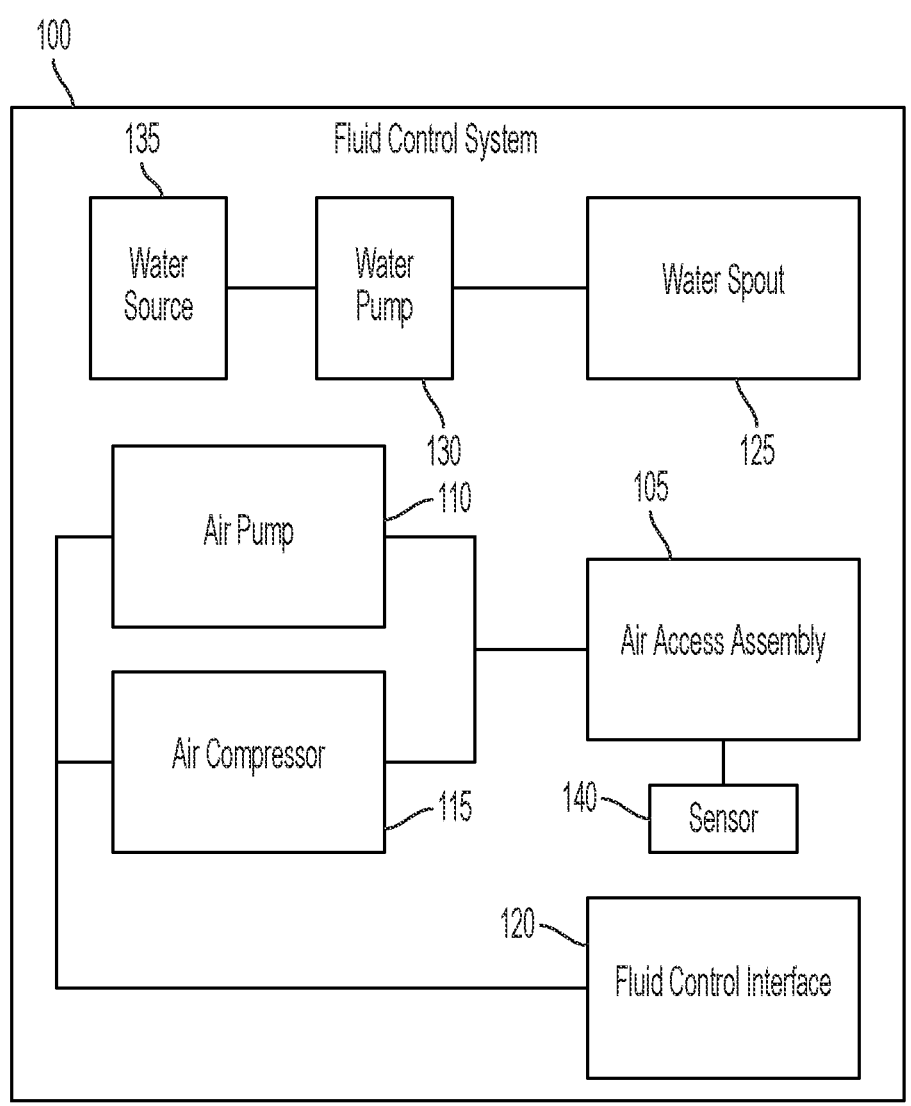
FIG. 1 depicts a schematic view of an example fluid control system, in accordance with some aspects.

Following below are more detailed descriptions of various concepts related to, and implementations of, methods, apparatuses, and systems for providing both high pressure (HP) air and low pressure (LP) air via a single fitting or control interface. The HP air can be referred to as low volume air, and the LP air can be referred to as high volume air. The various concepts introduced above and discussed in greater detail below may be implemented in any of numerous ways.

The present disclosure is directed to systems and methods of providing a fluid control system that can reduce the size of the interface needed to provide various types of fluids for various tasks. A control interface can provide a HP air access that is combined with a LP air access such that a user can use the same control interface for tasks that require either or both HP air and LP air. Accordingly, air can be provided or pulled (e.g., for a vacuum) at different pressures via a single access point. The amount of space generally occupied by a HP air connection point and a LP air connection point can be reduced by combining the HP air connection point and the LP air connection point into a fitting of an access point. The access point can facilitate easier hook up and use of the HP and LP air functions for a user by having the access points for both systems in the same location.

The disclosed solutions can include an air access assembly. The air access assembly can include an air access interface with a HP air access through which HP air flows and a LP air access through which LP air flows. The HP air access can have a shape that is concentric to a shape of the LP air access. A HP hose (e.g., line) and a LP hose can couple with the air access assembly via the air access interface at different times (e.g., one at a time). The HP hose and the LP hose can lock into the air access assembly during use and can be disconnected from the air access assembly after use. For example, the air access interface can include a push plate. The push plate can move in a linear direction to disconnect the hose. For example, an axis can extend concentrically within the HP air ace and the LP air access. The push plate can move along the axis to disconnect the hose. Disconnecting the hose can include pushing the push plate to release the pressure in the hose before disconnecting the hose from the air access assembly. The single motion of the push plate can achieve a quick release of the hose from the air access assembly by completing both the release of air pressure and the disconnecting of the hose.

The air access assembly can include a switch configured to change the function of the air access assembly. For example, the function can be at least one of pushing air into a hose (e.g., for inflating a component/element/device/etc., power washing, leaf blowing, etc.) and pulling air from a hose (e.g., for deflating a component, vacuuming, etc.). The air access assembly can, for example, have a first switch that, when activated, can initiate the pulling air function, and have a second switch that, when activated, can initiate a pushing air function. The air access assembly can include a sensor. The sensor can, for example, detect a type of hose (e.g., HP or LP) that is coupled with the air access assembly.

The disclosed solutions can include a control interface. The control interface can be an interactive tool to receive input from a user to adjust a function of the air access assembly. For example, the control interface can include an interactive element (e.g., button, knob, switch, dial, touch-screen, etc.) to receive an input from a user. The input can be, for example, a target pressure of an object being inflated or to switch between pulling air and pushing air, among others. The disclosed solutions can include a water spout. The water spout can be disposed adjacent to at least one of the control interface or the air access interface.

The disclosed solutions can have a technical advantage of providing various fluid control capabilities via a single access point. For example, HP air and LP air can be provided via a single air access interface. The disclosed solutions can control the air access assembly coupled with the air access interface to provide various functions (e.g., push air versus pull air, change pressure of air, etc.). The disclosed solutions can provide additional fluid control capabilities (e.g., water supply via the water spout) in a small area such that access for a user to various fluid systems is easy and convenient.

FIG. 1 depicts a schematic diagram of an example apparatus, shown as fluid control system 100. The fluid control system 100 can control any fluid (e.g., any substance capable of flowing). For example, the fluid can include any liquid or gas. For example, the fluid control system 100 can control any gas including, but not limited to air or nitrogen. The fluid control system 100 can control any liquid including, but not limited to water or coolant. The fluid can have any viscosity. For example, the fluid can have a viscosity above 10 milli-Pascal-seconds (10 centipoise) (e.g., silicone sealant). The fluid can have a viscosity equal to or below 10 milli-Pascal-seconds (e.g., water). The fluid control system 100 can provide a fluid or control a fluid to perform a specific task. For example, the fluid control system 100 can push out air to inflate an object, pull in air to act as a vacuum, or provide water to fill a container or wash an object. The fluid control system 100 can include at least one fluid access assembly, shown as air access assembly 105. The air access assembly 105 can also be a water access assembly or other fluid access assembly that can function as described herein for fluids other than air (e.g., water). The air access assembly 105 can provide a connection point for an air hose (e.g., line, tube, conduit, etc.) or other component to receive air being pushed or pulled by the fluid control system 100. For example, the air access assembly 105 be coupled with at least one air control device, shown as air pump 110. The air pump 110 can drive LP air to move through the air access assembly 105 and through a hose coupled with the air access assembly 105. The air access assembly 105 can be coupled with a second air control device, shown as air compressor 115. The air compressor 115 can cause HP air to move through the air access assembly 105. As such, the air access assembly 105 can provide both HP and LP pressure air to a hose (or other component) coupled with the air access assembly 105.

The fluid control system 100 can include at least one control interface 120. The control interface 120 can control a function of the air access assembly 105. For example, a function of the air access assembly 105 can include filling up an object with air to a target pressure or switching between pushing air and pulling air. For example, the control interface 120 can cause the air access assembly 105 to provide HP air to an object to fill the object to a target pressure. The control interface 120 can cause the air access assembly 105 to pull in LP air to deflate a first object and to push out LP air to inflate a second object. The control interface 120 can be coupled (e.g., wired or wirelessly communicably coupled) with at least one of the air pump 110 and the air compressor 115. The control interface 120 can control the air pump 110 and the air compressor 115 such that the air access assembly 105 can perform the desired function.

The fluid control system 100 can include at least one water spout 125. The water spout 125 can dispense water to fill a container or wash an object. The water spout 125 can be coupled with at least one water control device, shown as water pump 130. The water pump 130 can be coupled with a water source 135. The water pump 130 can cause water to flow from the water source 135 (e.g., a tank, reservoir, outlet, and so on) to the water spout 125 and out of the water spout 125. The water spout 125 can be similar to the air access assembly 105. For example, the water spout 125 can have a first access for first water and a second access for second water. The first access can provide high pressure water (e.g., low volume water) and the second access can provide low pressure water (e.g., high volume water).

The control interface 120 can control a function of the water spout 125. For example, a function of the water spout 125 can include dispensing water at a target rate. The control interface 120 can cause the water spout 125 to dispense water at the target rate. The control interface 120 can be communicably coupled (e.g., wired or wirelessly) with the water pump 130. The control interface 120 can control the water pump 135 such that the water spout 125 can perform the desired function.

The fluid control system 100 can include at least one sensor 140. The sensor 140 can be coupled with at least one of the air access assembly 105 and the water spout 125. For example, the sensor 140 can detect which connection point a hose is coupled with (e.g., the air access assembly 105 or the water spout 125). The sensor 140 can detect the type of hose (e.g., LP or HP) that is coupled with the air access assembly 105. For example, the sensor 140 can be an electrical or electro-mechanical sensor. The sensor 140 can, for example, detect a shape of the hose coupled with the air access assembly 105 and transmit a signal to a receiver indicating the shape of the hose. The shape of the hose can indicate the type of hose. The receiver can be a computing system configured to determine the type of hose coupled with the air access assembly 105 based on the signal and transmit a control signal based on the type of hose.

The functionality of the control interface 120 can change based, at least partially, on which connection point a hose is coupled with or on the type of hose that is coupled with the air access assembly 105, or both. For example, for a LP hose coupled with the air access assembly 105, the control interface 120 can switch the functionality of the air access assembly 105 between pulling in air and pushing out air. For a HP hose coupled with the air access assembly 105, the control interface 120 can set a target pressure for an object that is being inflated (e.g., target tire pressure). For a hose coupled with the water spout 125, the control interface 120 can set a target dispensing rate for the water being dispensed.

Figure 2A:
FIG. 2A depicts a front view of an example fluid control system, in accordance with some aspects.
Figure 2A:
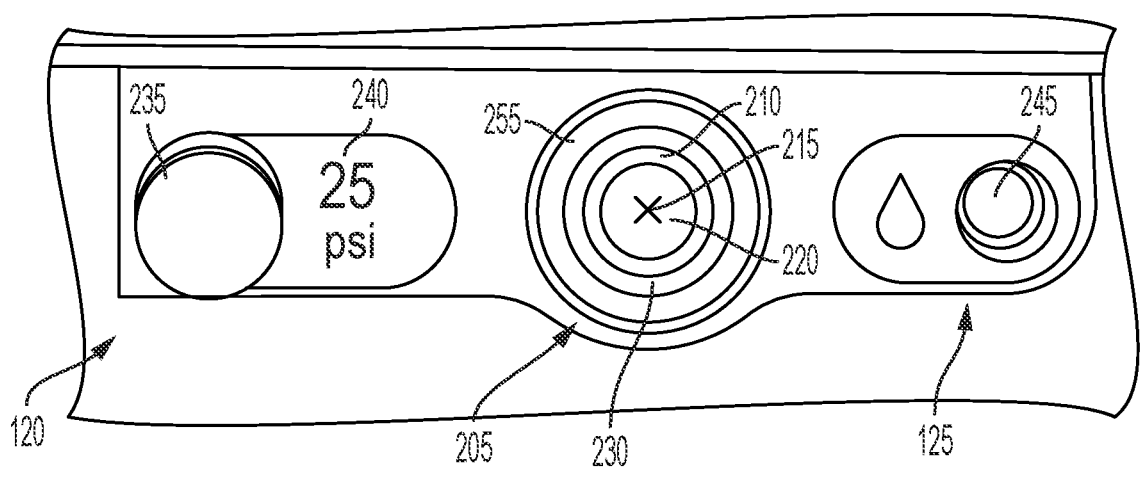

FIG. 2A depicts a front view of an interface of the fluid control system 100. The fluid control system 100 can include at least one air access interface 205. The air access interface 205 can be a part of (e.g., integral with) or coupled with the air access assembly 105. The air access interface 205 can provide a connection point for an air hose. The hose can couple with the air access interface 205 to receive air at various pressures. For example, a hose can couple with the air access interface 205 to receive HP air or LP air. For example, a HP hose can couple with the air access interface 205 to receive HP air and a LP hose can couple with the air access interface 205 to receive LP air.

The air access interface 205 can include a first surface, shown as inner surface 210. The inner surface 210 can have any shape. For example, the inner surface 210 can have a round, square, rectangular, or triangular shape. For example, the inner surface 210 can have a circular shape as shown. The inner surface 210 can be centered on a central axis 215. The inner surface 210 can define a first air access 220. For example, the inner surface 210 can surround at least a portion of the first air access 220. The first air access 220 can provide a path for air to travel. For example, the first air access 220 can pass first air with a first pressure. For example, the first air access 220 can be a path for HP air. The first air access 220 can have any size. The size of the first air access 220 can be based, at least partially, on a size of a hose fitting. For example, the first air access 220 can receive at least a portion of a hose fitting to couple the hose fitting with the air access interface 205. The hose fitting can be a HP hose fitting. For example, a HP hose with a HP hose fitting can couple with the air access interface 205 via the first air access 220. The hose fitting can be a LP hose fitting. For example, a LP hose with a LP hose fitting can couple with the air access interface 205 via the first air access 220.

The air access interface 205 can include a second surface, shown as outer surface 225. The outer surface 225 can have any shape. For example, the outer surface 225 can have a round, square, rectangular, or triangular shape. For example, the outer surface 225 can have a circular shape as shown. The outer surface 225 can be the same shape as, or a different shape than, the inner surface 210. The outer surface 225 can be centered on the central axis 215. The outer surface 225 can be disposed radially outward from the inner surface 210. For example, the outer surface 225 can surround at least a portion of the inner surface 210. The outer surface 225 can be spaced apart from the inner surface 210 such that there is a gap between the outer surface 225 and the inner surface 210. The outer surface 225 can define a second air access 230. For example, the gap between the outer surface 225 and the inner surface 210 can be the second air access 230 such that the second air access 230 can be disposed between the inner surface 210 and the outer surface 225. The outer surface 225 can surround at least a portion of the second air access 230. The second air access 230 can provide a path for air to travel. For example, the second air access 230 can pass second air with a second pressure. For example, the second air access 230 can be a path for LP air. The first pressure of the first air passing through the first air access 220 can be greater than the second pressure of the second air passing through the second air access 230. The outer surface 225 can be concentric with the inner surface 210 such that the first air access 220 is concentric with a second air access 230.

The fluid control system 100 can include at least one control interface 120. The control interface 120 can be disposed adjacent to the air access interface 205 (and the air access assembly 105). The control interface 120 can receive a user input. The user input can control at least one of the air access assembly 105 and the water spout 125 according to the user input. For example, the control interface 120 can include at least one interactive element 235. The interactive element 235 can be any element able to receive an input. For example, the interactive element 235 can be a knob, switch, dial, button, touchscreen, keyboard, among others. The interactive element 235 can receive a user input indicative of a selection of a function of the air access assembly 105. For example, a function of the air access assembly 105 can be at least one of pull in air (e.g., vacuum) or push out air (e.g., inflate an external object). The user input can indicate a selection of at least one of pull in air or push out air. A function of the air access assembly 105 can include inflating an external object (e.g., tire, mattress, etc.) to a target pressure. The user input can indicate a selection of the target pressure for the external object. The air access assembly 105 can provide air (e.g., HP air) to the external object to reach the target pressure.

The control interface 120 can include at least one display 240. The display 240 can be disposed adjacent to the interactive element 235. The display 240 can provide a visual associated with the function of the air access assembly 105. For example, the display 240 can display a target pressure for an air access assembly 105 with a function of inflating an external object to the target pressure. The display 240 can display a graphic indicative of pulling in air (e.g., a down arrow, the word "in," a negative sign ("−"), among others) or pushing out air (e.g., an up arrow, the word "out," a positive sight ("+"), among others). The visual can be associated with the function selected by a user via the interactive element 235.

The fluid control system 100 can include at least one sensor 140. The sensor 140 can detect what type of hose is coupled with the air access interface 205. For example, the sensor 140 can detect whether a HP hose or a LP hose is coupled with the air access interface 205. The sensor 140 can, for example, detect a shape of the hose coupled with the air access assembly 105 and transmit a signal to a receiver indicating the shape of the hose. The shape of the hose can indicate the type of hose. The receiver can be a computing system configured to determine the type of hose coupled with the air access assembly 105 based on the signal and transmit a control signal based on the type of hose. The function of the control interface 120 can be based on the type of hose coupled with the air access interface 205 (e.g., the type of hose detected by the sensor 140). For example, with a HP hose coupled with the air access interface 205, the control interface 120 can have a first function. The first function can be, for example, to adjust the target pressure for an external object. The external object can receive at least one of the first air from the first air access 220 and the second air from the second air access 230. With a LP hose coupled with the air access interface 205, the function of the control interface 120 can be a second function. The second function can be, for example, to switch the direction of air flow between pulling air in and pushing air out. The function of the control interface 120 can be at least one of the first function and the second function.

The fluid control system 100 can include at least one water spout 125. The water spout 125 can be disposed adjacent to at least one of the air access interface 205 and the control interface 120. For example, the control interface 120 can be disposed on a first side of the air access interface 205 and the water spout 125 can be disposed on a second side of the air access interface 205. The second side can be opposite the first side. The control interface 120 can be disposed between the air access assembly 105 and the water spout 125. The water spout 125 can be disposed between the air access assembly 105 and the control interface 120. The water spout 125 can include a water outlet 245. A water hose can be coupled with the water spout 125 via the water outlet 245. The fluid control system 100 can include a sensor 140 to detect the type of hose that is coupled with the water spout 125. A function of the control interface 120 can be based, at least partially, on whether a hose is coupled with the water spout 125. For example, with a hose coupled with the water spout 125, the control interface 120 can control a rate at which water is dispensed via the water spout 125. With a hose coupled with the air access interface 205, the control interface 120 can control an air pressure or a direction of the air.

Figure 2B:
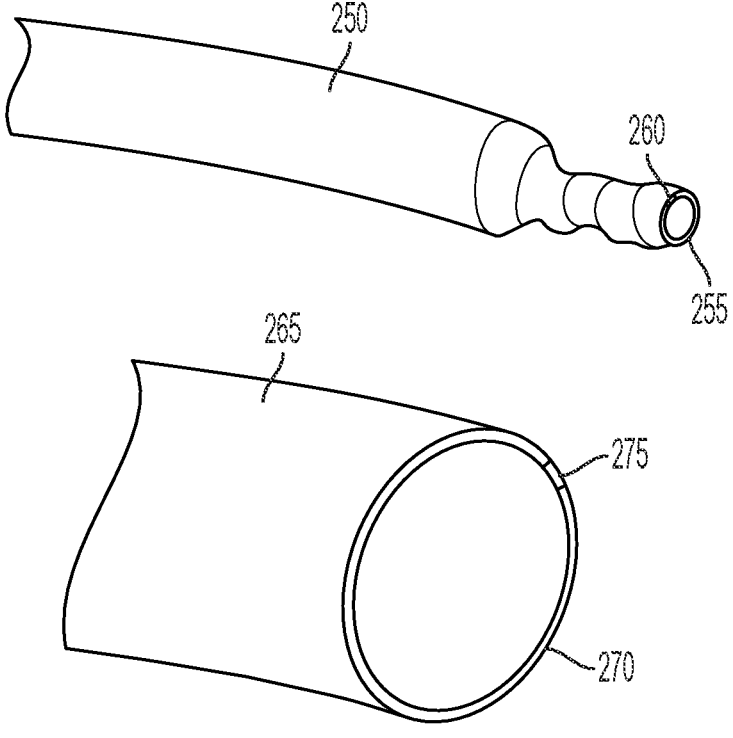
FIG. 2B depicts perspective sides views of example hoses, in accordance with some aspects.

FIG. 2B depicts perspective sides views of example hoses that can couple with the fluid control system 100 via at least the air access interface 205. For example, a first hose, shown as HP hose 250 can couple with the air access interface 205. The HP hose 250 can couple with the air access interface 205 to receive air via the first air access 220. An end 255 of the HP hose 250 can be inserted into, and received by, the first air access 220. The HP hose 250 can have an identifiable element, shown as first identifiable element 260. The first identifiable element 260 can be associated with the HP hose 250. The sensor 140 of the fluid control system 100 can identify the first identifiable element 260 with the HP hose 250 coupled with the air access interface 205.

A second hose, shown as LP hose 265 can couple with the air access interface 205. The LP hose 265 can couple with the air access interface 205 to receive air via the second air access 220. The LP hose 265 can couple with the air access interface 205 via at least one of the first air access 220 and the second air access 230. An end of the LP hose 270 can be disposed in or around the second air access 230. The LP hose 265 can have an identifiable element, shown as first identifiable element 275. The second identifiable element 275 can be associated with the LP hose 265. The sensor 140 of the fluid control system 100 can identify the second identifiable element 275 with the LP hose 265 coupled with the air access interface 205. The first and second identifiable elements 260, 275 can be any element that is detectable by a sensor 140. For example, the identifiable elements 260, 275 can be an electrically identifiable element (e.g., radio frequency identification tag).

The sensor 140 can detect an identifiable element 260, 275 that is coupled with or integral with a hose 250, 265 that is coupled with the fluid control system 100. The identifiable element 260, 275 can be associated with a predetermined type of hose. For example, the first identifiable element 260 can be coupled with the end 255 of the first hose (e.g., HP hose 250) and the second identifiable element 275 can be coupled with the end 270 of a second hose (e.g., LP hose 265). The sensor 140 can detect the first identifiable element 260 with the end 255 of the first hose coupled with the air access assembly 105. The sensor 140 can detect the second identifiable element 275 with the end 270 of the second hose coupled with the air access assembly 105. The sensor 140 can transmit a signal to a receiver indicating the identifiable element 260, 275 detected. The receiver can be a computing system configured to determine the type of hose coupled with the air access assembly 105 based on the signal and transmit a control signal based on the type of hose.

The control interface 120 can provide controls based on the interface that is coupled with a hose or a type of hose that is coupled with the interface. For example, with a hose coupled with the water spout 125, the control interface 120 can provide controls associated with controlling water (e.g., rate of water, volume of water, etc.). With a hose coupled with the air access interface 205, the control interface 120 can provide controls associated with controlling air (e.g., air pressure, air direction, etc.). The control interface 120 can provide controls based on the type of hose that is coupled with the interface. For example, with a HP hose 250 coupled with the air access interface 205, the control interface 120 can provide controls associated with HP air (e.g., a target pressure). With a LP hose 265 coupled with the air access interface 205, the control interface 120 can provide controls associated with LP air (e.g., direction of the air).

Figure 3:
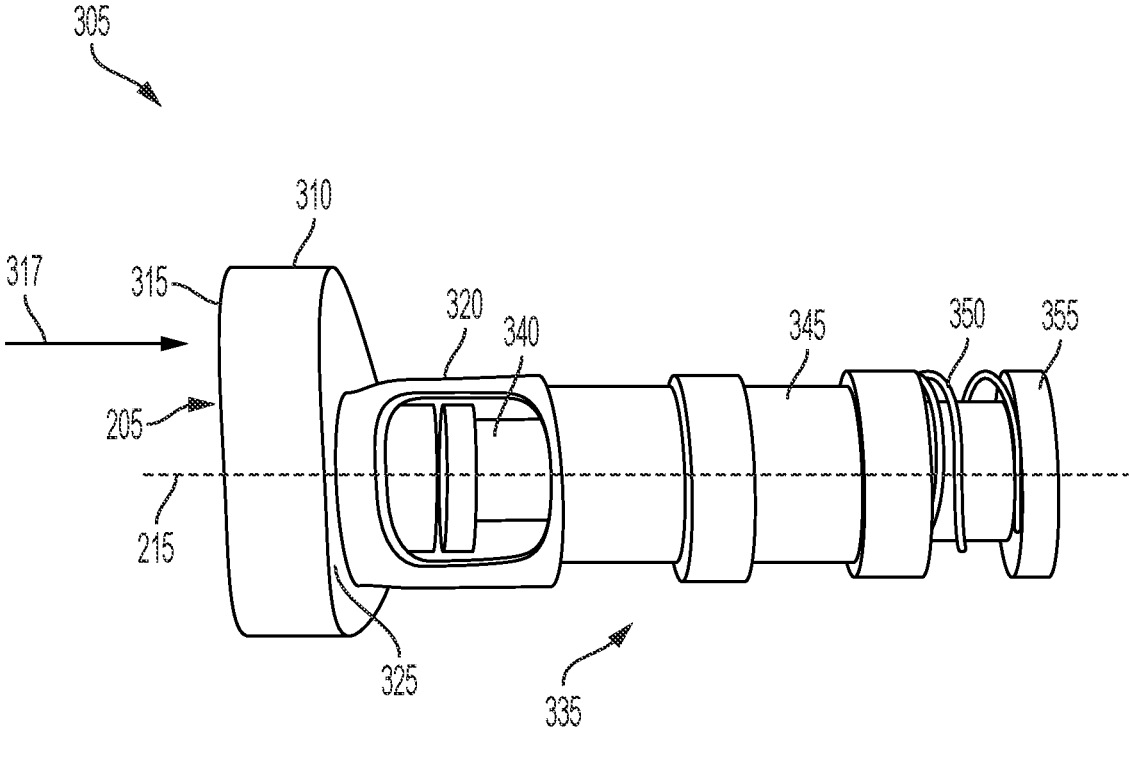
FIG. 3 depicts a partially exposed side view of an example air access assembly, in accordance with some aspects.

FIG. 3 depicts a partially exposed side view of an example air access assembly 305. The air access assembly 305 can be or include air access assembly 305. The air access assembly 305 can include at least one push member 310. The push member 310 can be integral with or coupled with the air access interface 205. For example, the outer surface 225 of the air access interface 205 can be a surface of the push member 310. The outer surface 225 can be disposed on front side 315 of the push member 310. The inner surface 210 can be flush with the outer surface 225 or the inner surface 210 can be disposed in front of or behind the outer surface 225. The push member 310 can be centered on the central axis 215. For example the push member 310 can be disposed concentrically with the inner surface 210. The push member 310 can move linearly. For example, the push member 310 can receive a force 317 via the outer surface 225. The force can cause the push member 310 to move linearly. The push member 310 can move along the central axis 215. As such, the outer surface 225 can move linearly along the central axis 215.

The push member 310 can include an extension member 320. The extension member 320 can extend from a rear side 325 of the push member 310. The extension member 320 and the push member 310 can define a first fitting. The extension member 320 can define a cavity 330. The cavity 330 can receive at least one component of the air access assembly 305. For example, the air access assembly 305 can include at least one fitting 335. The fitting 335 can be a second fitting that is dispose, at least partially, within the first fitting. For example, the fitting 335 can be disposed at least partially in the cavity 330. The fitting 335 can define the first air access 220. For example, the inner surface 210 can be a surface of the fitting 335. The second air access 230 can be disposed between the push member 310 and the fitting 335. The fitting 335 can be concentric with the push member 310.

The fitting 335 can facilitate coupling a hose fitting with the air access assembly 305 via the air access interface 205 and disconnecting the hose fitting from the air access assembly 305. For example, the fitting 335 can include a first member, shown as hose release member 340. The hose release member 340 can receive at least a portion of a hose fitting to couple the hose fitting with the air access assembly 305. The hose release member 340 can be disposed adjacent to the push member 310. The fitting 335 can include a second member, shown as pressure release member 345. The pressure release member 345 can release the air pressure that is applied to or provided to the hose coupled with the air access assembly 305. At least a portion of the hose release member 340 can be disposed between the push member 310 and the pressure release member 345.

Disconnecting the hose fitting from the air access assembly 305 can include releasing a pressure on the hose coupled with the fitting 1035 and disconnecting the hose from the fitting 1035. To disconnect the portion of the hose fitting from the air access assembly 305, the push member 310 (including the outer surface 225) can move in a linear direction (e.g., parallel with the central axis 215). For example, the push member 310 can interface with the pressure release member 345. For example, the extension member 320 of the push member 310 can interface with the pressure release member 345. The push member 310 can move (e.g., push) the pressure release member 345 in a direction. The push member 310 can interface with the hose release member 340. For example, the extension member 320 of the push member 310 can interface with the hose release member 340. The push member 310 can move (e.g., push) the pressure release member 345 in the direction. The direction can be parallel with the central axis 21. The direction can be the same direction that the push member 310 moves. The push member 310 can move the pressure release member 345 prior to moving the hose release member 340. For example, the push member 310 can interface with the pressure release member 345 and move the pressure release member 345 to release the pressure on the connected hose prior to moving the hose release member 340 and disconnecting the hose from the air access assembly 305. A single push of the push member 310 can actuate the pressure release and the disconnection of the hose from the air access assembly 305.

The air access assembly 305 can include a spring 350. The spring 350 can bias the fitting to an operating position. The spring 350 can be disposed between the pressure release member 345 and a base 355 of the air access assembly 305.

Figure 4:
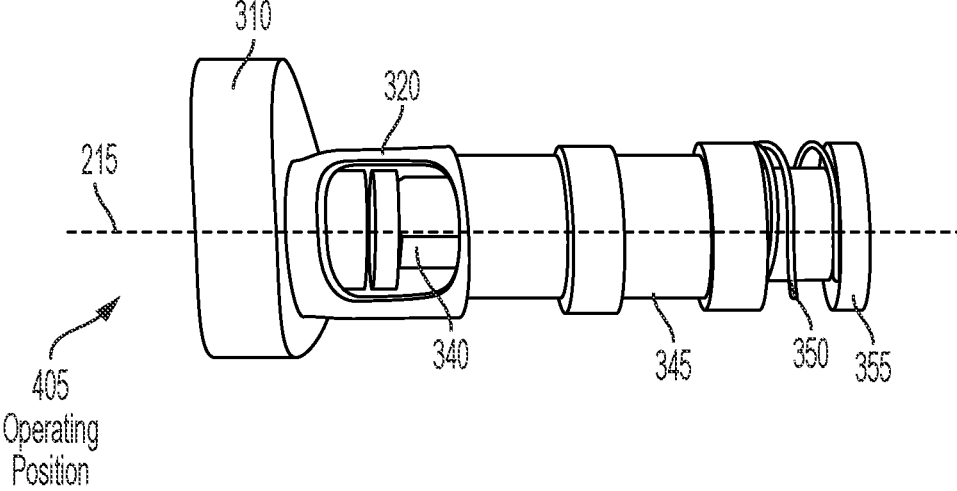
FIG. 4 depicts side views of an example air access assembly, in accordance with some aspects.
Figure 4:
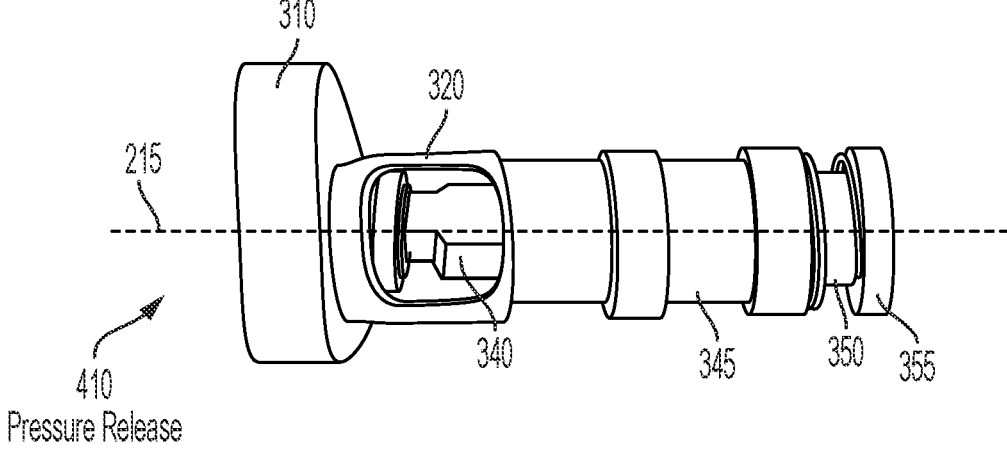
Figure 4:
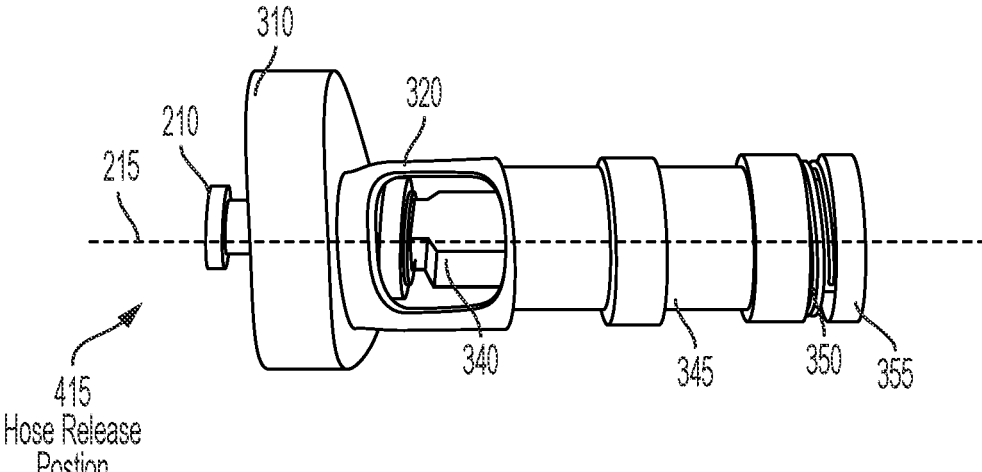

FIG. 4 depicts a plurality of side views of the air access assembly 305. The spring 350 can bias the air access assembly 305 to a first position, shown as operating position 405. The air access assembly 305 can be in the operating position 405 with a hose coupled to the air access assembly 305 or with no hose coupled to the air access assembly. In the operating position, the spring 350 can be in an extended position to position the pressure release member 345 and the hose release member 340 can be in an initial position. With a force applied to the push member 310, the air access assembly 305 can move to a second position, shown as pressure release position 410. The pressure release position 410 can reduce or eliminate the air pressure being applied to or provided to a hose that is coupled with the air access assembly 305. The pressure release position 410 can include the spring 350 being in a partially compressed position. At the pressure release position 410, the pressure release member 345 can move from the initial position to an intermediate position. The intermediate position of the pressure release member 345 can be closer to the base 355 than the initial position. The force can continue to push the push member 310 such that the air access assembly can move to a third position, shown as hose release position 415. The hose release position 415 can disconnect the hose from the air access assembly 305. The hose release position 415 can include the spring 350 being in a fully compressed position (e.g., more compressed than in the pressure release position 410). At the hose release position 415, the pressure release member 345 can move from the intermediate position to a final position. The final position of the pressure release member 345 can be closer to the base 355 than the intermediate position. At the hose release position 415, the hose release member 340 can move from the initial position to a final position. Causing the hose release member 340 to move from the initial position to the final position can disconnect the hose from the fitting 335 and the air access assembly 305. The hose release position 415 can include a portion of the fitting 335 to extend beyond the front side 315 of the push member 310. For example, the inner surface 210 of the air access interface 205 can extend beyond the front side 315 of the push member 310.

Figure 5:
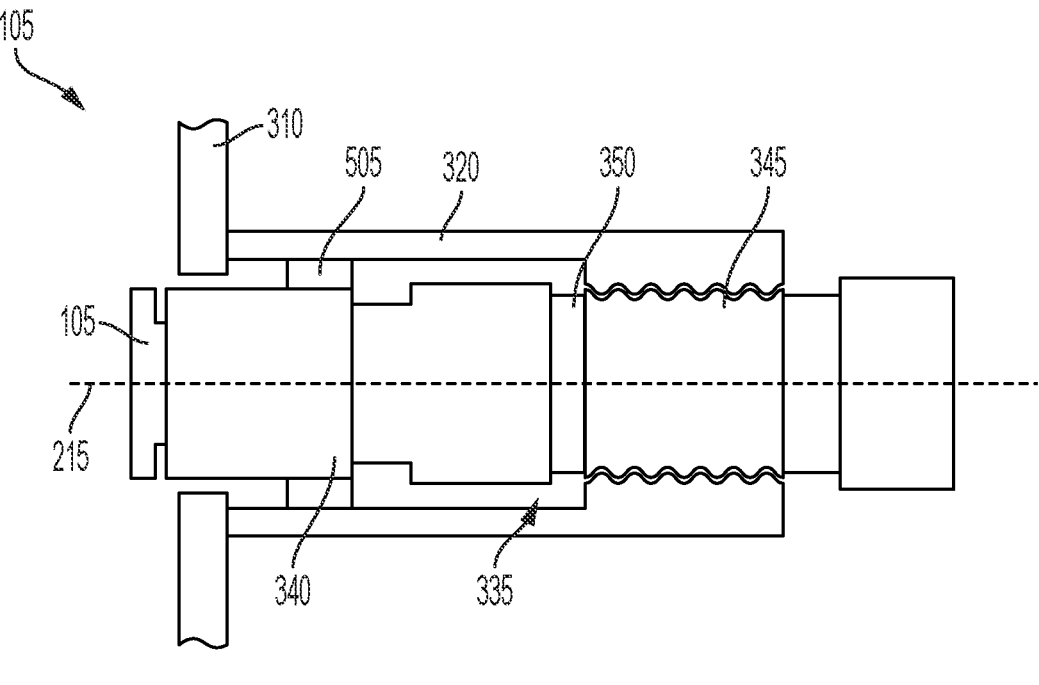
FIG. 5 depicts a side cross-sectional view of an example air access assembly, in accordance with some aspects.

FIG. 5 depicts a side cross-sectional view of the air access assembly 305. The fitting 335 can be centered on the central axis 215. The spring 350 can be disposed in various places within the air access assembly 305. For example, the spring 350, as shown in FIG. 5, among others, can be disposed at least partially between the hose release member 340 and the pressure release member 345. The hose release member 340 can include at least one wing 505. The wing 505 can extend radially from the hose release member 340. The wing 505 can interface with the rear side 325 of the push member 310 to move the hose release member 340 and disconnect the hose from the air access assembly 305.

Figure 6:
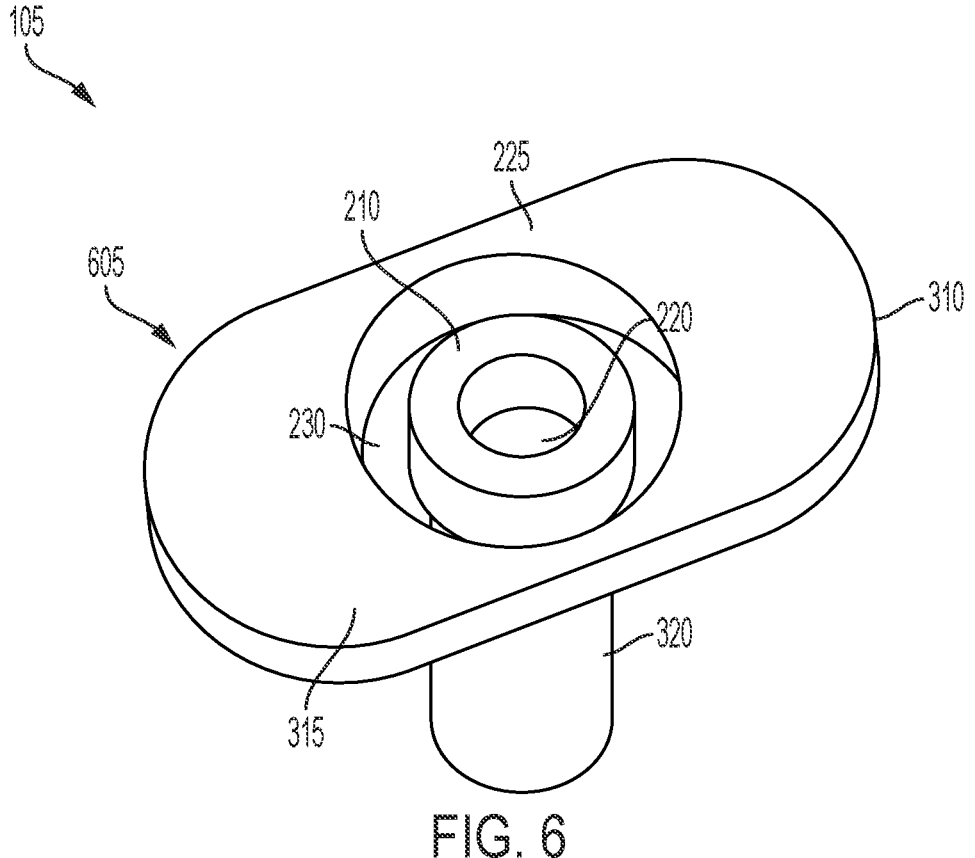
FIG. 6 depicts a front perspective view of an example air access assembly, in accordance with some aspects.

FIG. 6 depicts a front perspective view of air access assembly 305. The air access assembly can include an air access interface 605. The air access interface 605 can be air access interface 205. The outer surface 225 can be integral with the push member 310. For example, the outer surface 225 can be, or be a part of, the front side 315 of the push member 310. The outer surface 225 can receive the force to release a hose from the air access assembly 305. For example the outer surface 225 can move linearly along the central axis 215 to move the air access assembly 305 from the operating position 405, to the pressure release position 410, and to the hose release position 415.

Figure 7:
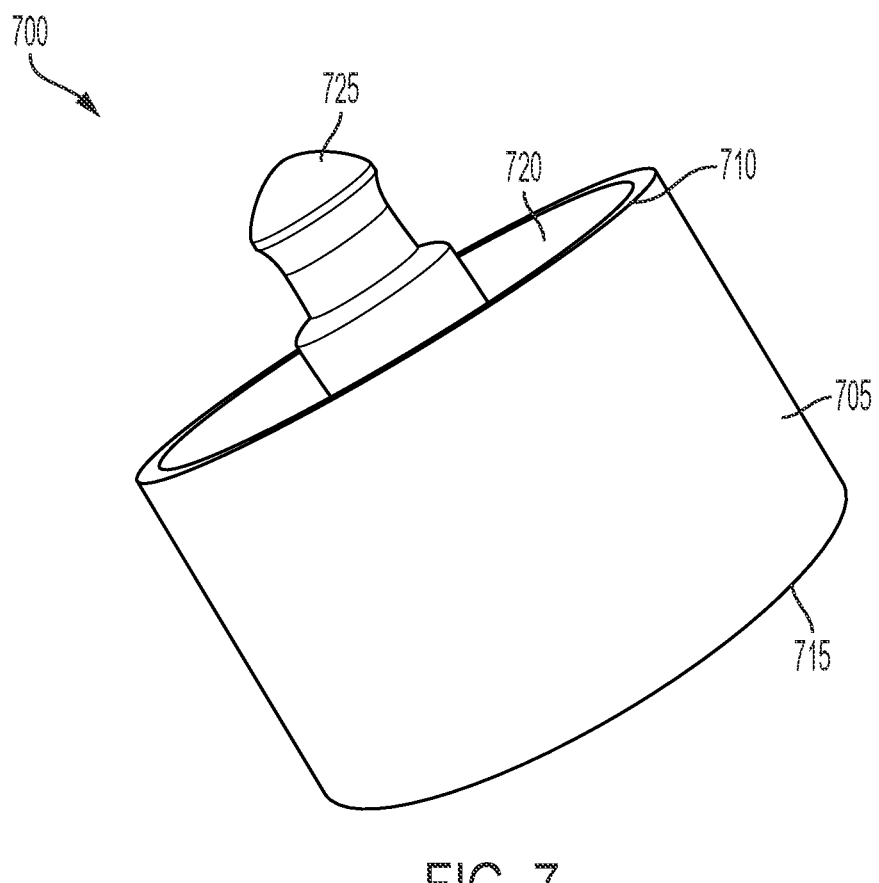
FIG. 7 depicts a side perspective view of an example hose fitting, in accordance with some aspects.

FIG. 7 depicts a side view of an example hose fitting 700. The hose fitting 700 can be a fitting for a LP hose. The hose fitting 700 can couple a hose with the air access assembly 305. For example, the hose fitting 700 can include a body 705. The body 705 can have a front edge 710 and a rear edge 715. The body 705 can define a body cavity 720. The body cavity 720 can receive air from the air access assembly 305. The hose fitting 700 can include a connection member 725. The connection member 725 can be inserted into the first air access 220 and couple with the fitting 335 of the air access assembly 305 via the first air access 220. The connection member 725 can be disposed centrally within the body 705. The connection member 725 can extend beyond the front edge 710 of the body 705 to be inserted into the first air access 220.

Figure 8:
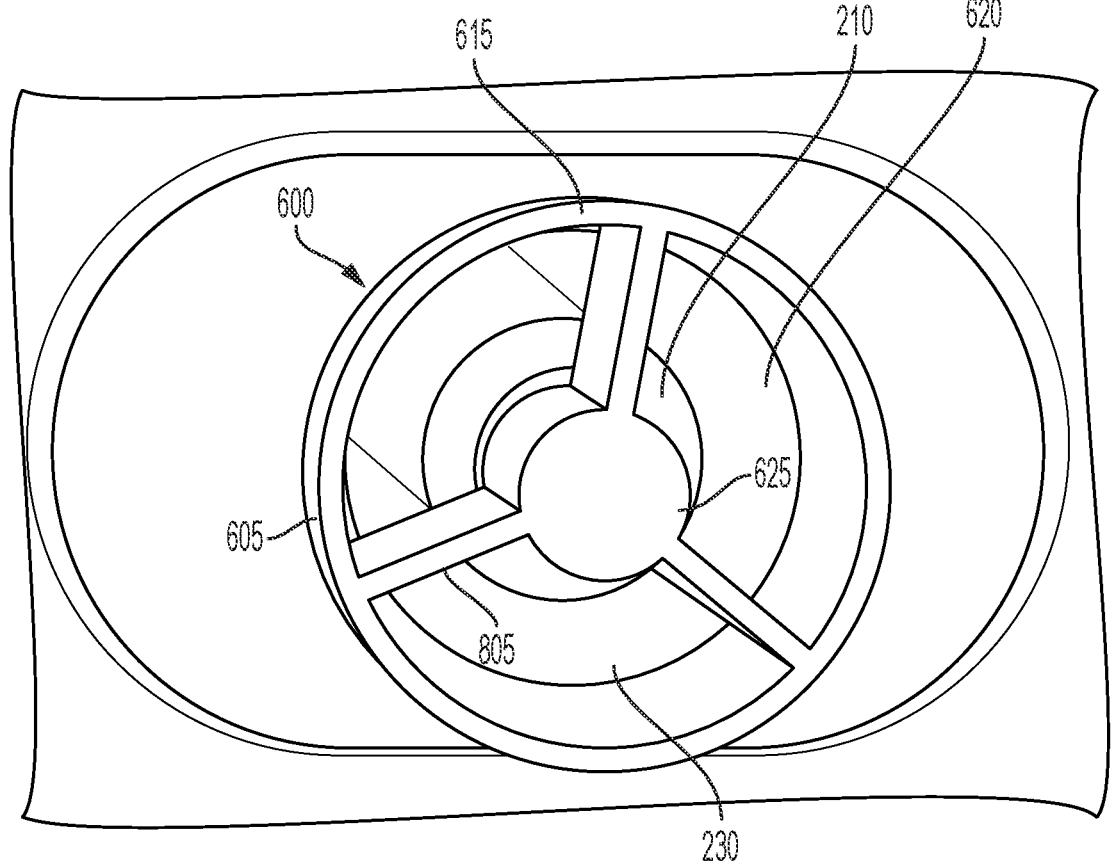
FIG. 8 depicts a rear view of an example hose fitting, in accordance with some aspects.

FIG. 8 depicts a rear view of the hose fitting 700. The body 705 can have any shape and any size. For example, the body 705 can have a cylindrical shape. At least one of the shape and size of the body 705 can be based, at least partially, on at least one of a shape and side of the second air access 230 (e.g., the body 705 can conform to the second air access 230). For example, the hose fitting 700 can be shaped and sized such that at least a portion of the body cavity 720 can align with the second air access 230 when the connection member 725 is engaged with or inserted into the first air access 220. The connection member 725 can block off or seal the first air access 220 and allow air to flow through the second air access 230. The hose fitting 700 can include at least one support member 805. The support member 805 can support the connection member 725 such that the connection member 725 can be disposed at a desired location within the body cavity 720. For example, the support member 805 can extend between the connection member 725 and the body 705. The hose fitting 700 can include a plurality of support member 805. For example, a plurality of support members 805 can be disposed equidistantly (+/−10%) apart from each other around the connection member 725.

Figure 9:
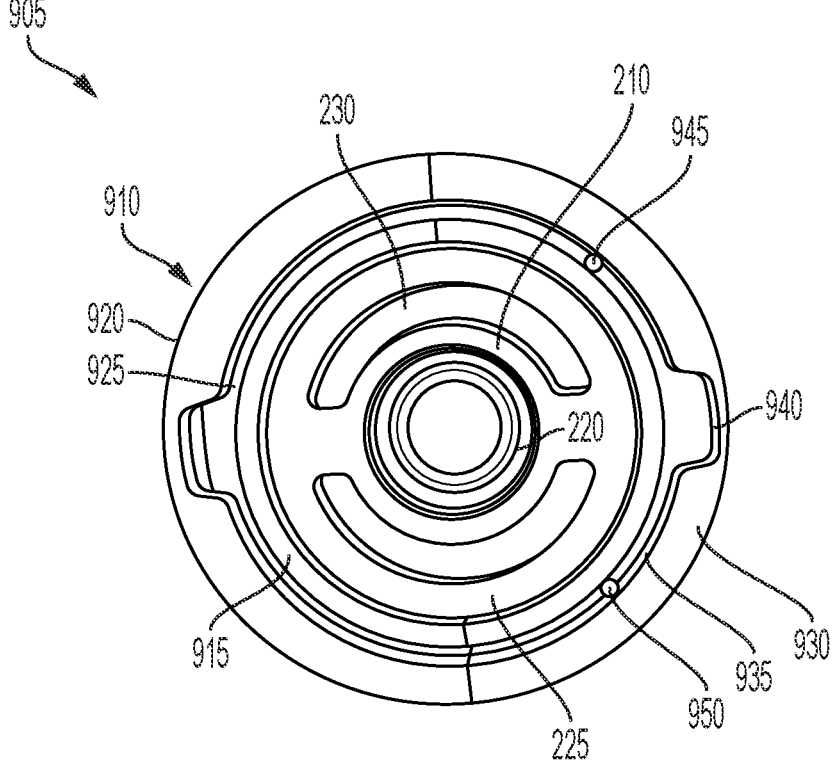
FIG. 9 depicts a front view of an example air access interface, in accordance with some aspects.

FIG. 9 depicts a front view of an air access interface 905. The air access interface 905 can be or include air access interface 205. For example, the air access interface 905 can include an inner surface 210 that defines a first air access 220. The air access interface 905 can include an outer surface 225 that defines a second air access 230. The air access interface 905 can be coupled with or be integral with the air access assembly 105 or air access assembly 305. A first hose can couple with the air access interface 905 via the first air access 220. For example, a HP hose can couple with the air access interface 905 via the first air access 220. The air access interface 905 can include a manifold 910. The manifold 910 can at least partially surround the first air access 220 and the second air access 230. The manifold 910 can include at least one inner wall 915. The inner wall 915 can be disposed adjacent to the outer surface 225 of the air access interface 905. The manifold 910 can include at least one outer wall 920. The outer wall 920 can be disposed radially outward from the inner wall 915. The outer wall 920 and the inner wall 915 can define a channel 925. The channel 925 can receive at least a portion of a hose fitting. For example, a second hose can couple with the air access interface 905 via the channel 925. The second hose can be a LP hose.

The manifold 910 can include a flange 930. The flange 930 can extend from the outer wall 920 toward the inner wall 915. The flange can have an inner edge 935. The inner edge 935 can be disposed adjacent to and spaced apart from the inner wall 915. The manifold 910 can include a recess 940 in the flange 930. For example, the recess 940 can extend into the flange 930 from the inner edge 935 toward the outer wall 920. The recess 940 can receive a corresponding portion of a hose fitting. For example, the hose fitting can have a tab. The recess 940 can receive the tab such that the tab can enter the channel 925 and couple the hose fitting with the air access assembly 105.

The air access interface 905 can include at least one switch. The switch can be any device capable of receiving an input that causes the air access assembly 105 to perform a desired function. The switch can be a micro switch. The air access interface 905 can include a first switch 945. The first switch 945 can activate a first function of the air access assembly 105. The first function can include moving air (e.g., second, LP air) in a first direction. For example, activating the first switch 945 can cause air to flow out through the air access interface 905 (e.g., through the second air access 230) and into a connected hose. The first switch 945 can be disposed radially outward from the second air access 230. For example, the first switch 945 can be disposed in the channel 925. The air access interface 905 can include a second switch 950. The second switch 950 can activate a second function of the air access assembly 105. The second function can include moving air (e.g., second, LP air) in a second direction. The second direction can be opposite the first direction. For example, activating the second switch 950 can cause air to flow in through the air access interface 905 (e.g., through the second air access 230). The second switch 950 can be disposed radially outward from the second air access 230. For example, the second switch 950 can be disposed in the channel 925. The first switch 945 can be disposed on a first side of the recess 940 and the second switch 950 can be disposed on a second side of the recess 940. For example, with a tab of a hose fitting disposed in the channel 925 via the recess 940, the hose fitting can rotate in the first direction for the tab to activate the first switch 945 and can rotate in the second direction for the tab to activate the second switch 950. Upon activation, the first switch and the second switch can transmit an electrical signal to an electrical device to control the electrical device. For example, the electrical signal can be transmitted to at least one of the air pump 110 and the air compressor 115 to actuate the air pump 110 or the air compressor 115 to drive air through the air access interface 905.

Figure 10:
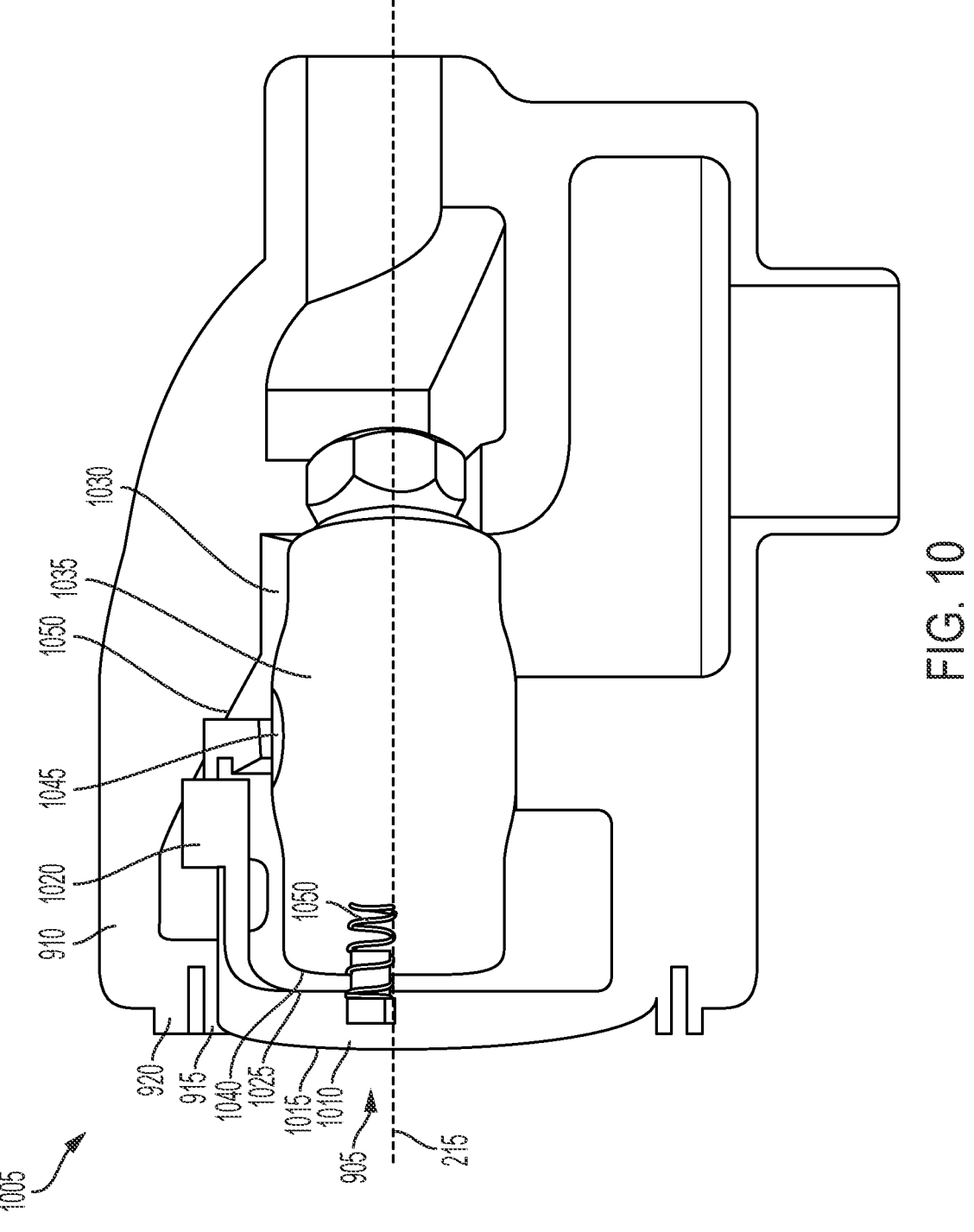
FIG. 10 depicts a side cross-sectional view of an example air access assembly, in accordance with some aspects.

FIG. 10 depicts a side cross-sectional view of an air access assembly 1005. The air access assembly 1005 can be or include air access assembly 105. The air access assembly 1005 can include at least one push member 1010. The push member 1010 can be integral with or coupled with the air access interface 905. For example, the outer surface 225 of the air access interface 905 can be a surface of the push member 1010. The outer surface 225 can be disposed on front side 1015 of the push member 1010. The inner surface 210 can be flush with the outer surface 225 or the inner surface 210 can be disposed in front of or behind the outer surface 225. The push member 1010 can be centered on the central axis 215. For example the push member 1010 can be disposed concentrically with the inner surface 210. The push member 1010 can move linearly. For example, the push member 1010 can receive a force via the outer surface 225. The force can cause the push member 1010 to move linearly. The push member 310 can move parallel (+/−10%) with the central axis 215. As such, the outer surface 225 can move linearly and parallel with the central axis 215.

The push member 1010 can include an extension member 1020. The extension member 320 can extend from a rear side 1025 of the push member 1010. The manifold 910 can define a cavity 1030. The cavity 1030 can receive at least one component of the air access assembly 1005. For example, extension member 1020 can extend into the cavity 1030. The air access assembly 1005 can include at least one fitting 1035. The fitting 1035 can be disposed at least partially in the cavity 1030. The fitting 1035 can define the first air access 220. For example, the inner surface 210 can be a surface of the fitting 1035. The inner surface 210 can be a surface disposed adjacent to a front end 1040 of the fitting 1035.

The fitting 1035 can facilitate coupling a hose fitting with the air access assembly 1005 via the air access interface 905 and disconnecting the hose fitting from the air access assembly 1005. For example, a portion of a hose fitting of a hose (e.g., a HP hose) can be received by the fitting 1035 via the front end 1040. Disconnecting the hose fitting from the air access assembly 1005 can include releasing a pressure on the hose coupled with the fitting 1035 and disconnecting the hose from the fitting 1035. To disconnect the portion of the hose fitting from the air access assembly 1005, the push member 1010 (including the outer surface 225) can move in a linear direction (e.g., parallel with the central axis 215). The linear motion of the push member 1010 can cause the extension member 1020 to move and activate the release of the hose. For example, the fitting 1035 can have a pressure release member 1045. The extension member 1020 can actuate the pressure release member 1045 to release the hose fitting from the fitting 1035. For example, the manifold 910 can have an angled surface 1050. As the push member 1010 moves linearly, the extension member 1020 can contact the angled surface 1050. The angled surface 1050 can force an end of the extension member 1020 to move toward the fitting and contact the pressure release member 1045. The extension member 1020 can activate the pressure release member 1045. Activation of the pressure release member 1045 can release a pressure of the hose. The air access assembly 1005 can include at least one spring 1055. The spring 1055 can bias the push member 1010 back to the original position. Moving the push member 1010 back to the original position can cause the extension member 1020 to deactivate the pressure release member 1045. Deactivation of the pressure release member 1045 can cause the fitting 1035 to release the hose fitting and disconnect the hose fitting from the air access assembly 1005. A single push and release of the push member 1010 can actuate the pressure release and the disconnection of the hose from the air access assembly 1005.

Figure 11:
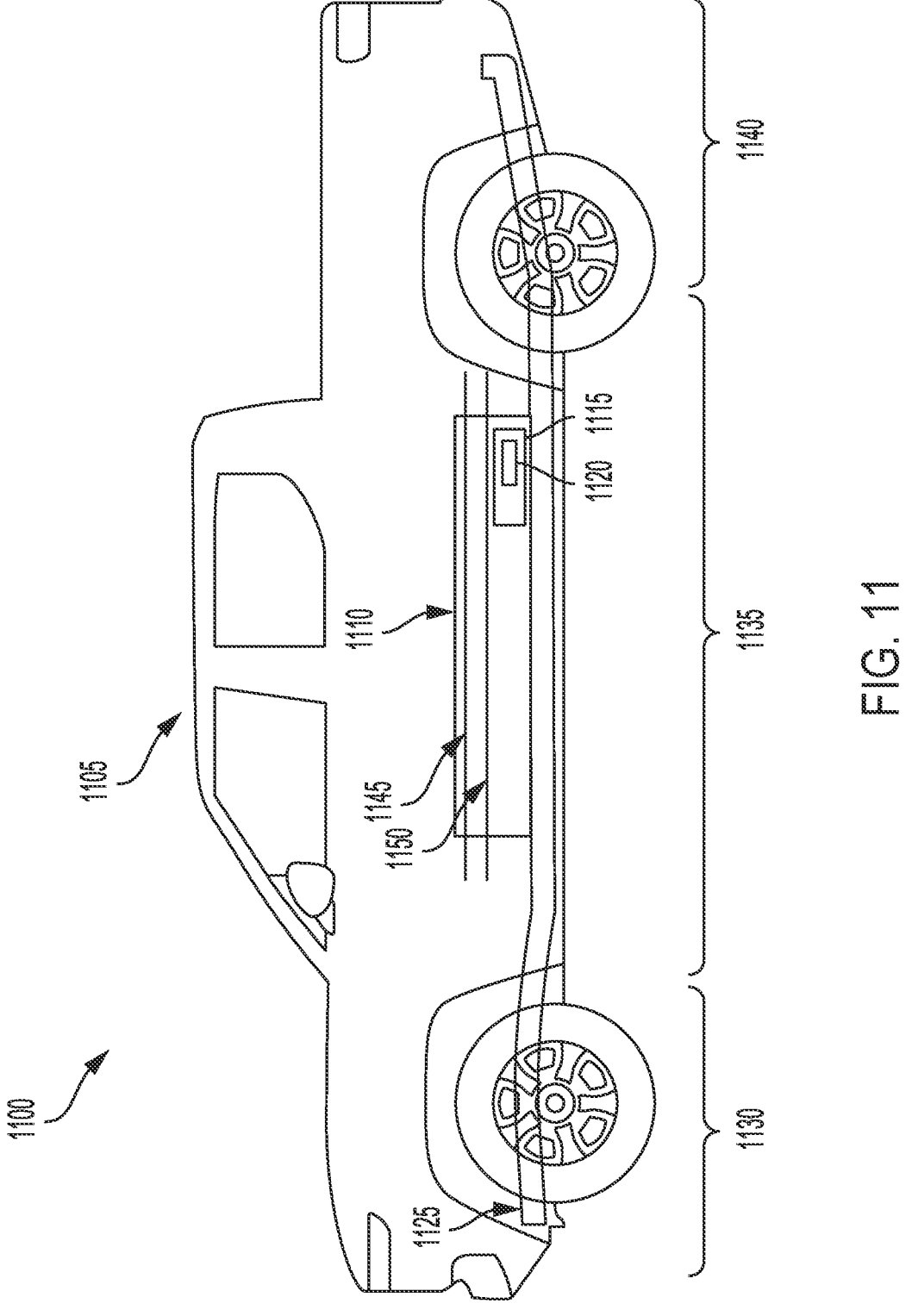
FIG. 11 depicts a cross-sectional view of an example electric vehicle, in accordance with some aspects.

FIG. 11 depicts is an example cross-sectional view 1100 of an electric vehicle 1105 installed with at least one battery pack 1110. Electric vehicles 1105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 1110 may also be used as an energy storage system to power a building, such as a residential home or commercial building. Electric vehicles 1105 can be fully electric or partially electric (e.g., plug-in hybrid) and further, electric vehicles 1105 can be fully autonomous, partially autonomous, or unmanned. Electric vehicles 1105 can also be human operated or non-autonomous. Electric vehicles 1105 such as electric trucks or automobiles can include on-board battery packs 1110, battery modules 1115, or battery cells 1120 to power the electric vehicles. The electric vehicle 1105 can include a chassis 1125 (e.g., a frame, internal frame, or support structure). The chassis 1125 can support various components of the electric vehicle 1105. The chassis 1125 can span a front portion 1130 (e.g., a hood or bonnet portion), a body portion 1135, and a rear portion 1140 (e.g., a trunk, payload, or boot portion) of the electric vehicle 1105. The battery pack 1110 can be installed or placed within the electric vehicle 1105. For example, the battery pack 1110 can be installed on the chassis 1125 of the electric vehicle 1105 within one or more of the front portion 1130, the body portion 1135, or the rear portion 1140. The battery pack 1110 can include or connect with at least one busbar, e.g., a current collector element. For example, the first busbar 1145 and the second busbar 1150 can include electrically conductive material to connect or otherwise electrically couple the battery modules 1115 or the battery cells 1120 with other electrical components of the electric vehicle 1105 to provide electrical power to various systems or components of the electric vehicle 1105.

The electric vehicle 1105 can include at least one fluid control system 100. The fluid control system 100 can include at least one of the air access assembly 105, control interface 120, and the water spout 125. For example, the electric vehicle 1105 can include an air access assembly 105. The air access assembly 105 can be or include at least one of air access assembly 305 and air access assembly 1005. For example, the air access assembly 105 can include a first air access 220 to pass a first air with a first pressure (e.g., HP air). The air access assembly 105 can include a second air access 230 to pass a second air with a second pressure (e.g., LP air). The first air pressure can be greater than the second air pressure. The first air access 220 can be concentric with the second air access 230.

The fluid control system 100 can include a control interface 120. The control interface can be disposed adjacent to the air access assembly 105. The control interface 120 can include an interactive element 235. The interactive element 235 can receive an input indicative of a user selection of a function of the air access assembly 105. The control interface 120 can include a display 240. The display 240 can provide a visual associated with (e.g., indicative of) the function selected.

The fluid control system 100 of the electric vehicle 1105 can include a water spout 125. The water spout 125 can be disposed adjacent to at least one of the air access assembly 105 and the control interface 120. For example, the control interface 120 can be disposed on a first side of the air access assembly 105 and the water spout 125 can be disposed on a second side of the air access assembly 105. The first side can be opposite the second side.

Figure 12:
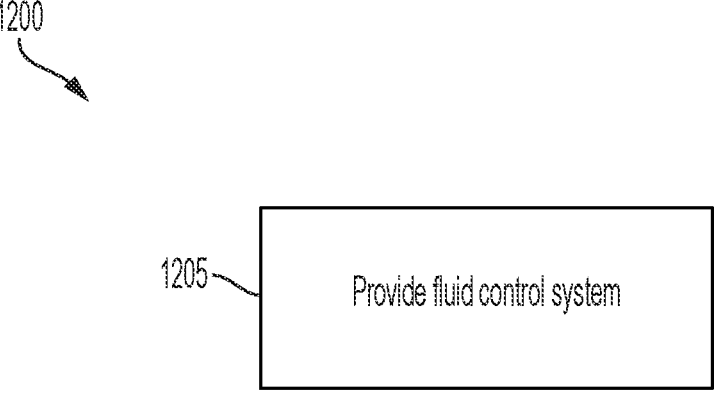
FIG. 12 depicts a flow diagram illustrating an example method to provide a fluid control system, in accordance with some aspects.

FIG. 12 depicts an example method 1200 to provide a fluid control system 100. Method 1200 can include providing a fluid control system (Act 1205). Act 1205 of providing a fluid control system can include providing an air access assembly 105. The air access assembly 105 can be or include at least one of air access assembly 305 and air access assembly 1005. The air access assembly 105 can include a first air access 220 to pass first air with a first air pressure (e.g., HP air). The air access assembly 105 can include a second air access 230 to pass second air with a second air pressure (e.g., LP air). The first air pressure can be greater than the second air pressure. The first air access 220 can be concentric with the second air access 230.

Act 1205 can include providing a control interface 120. The control interface 120 can be disposed adjacent to the air access assembly 105. The control interface 120 can, for example, receive a user input indicative of a selection of a function of the air access assembly (e.g., a selection of a target pressure for an external object). The external object can receive at least one of the first air and the second air to reach the target pressure. The control interface 120 can include an interactive element 235. The interactive element 235 can receive the input indicative of a user selection of a function of the air access assembly. The control interface 120 can include a display 240. The display 240 can provide a visual associated with (e.g., indicative of) the function selected.

Act 1205 can include disposing a water spout 125 adjacent to the air access assembly 105. The water spout 125 can be adjacent to at least one of the air access assembly 105 and the control interface 120. For example, the control interface 120 can be disposed on a first side of the air access assembly 105 and the water spout 125 can be disposed on a second side of the air access assembly 105. The control interface 120 can be disposed between the air access assembly 105 and the water spout 125. The water spout 125 can be disposed between the air access assembly 105 and the control interface 120.

Figure 13:
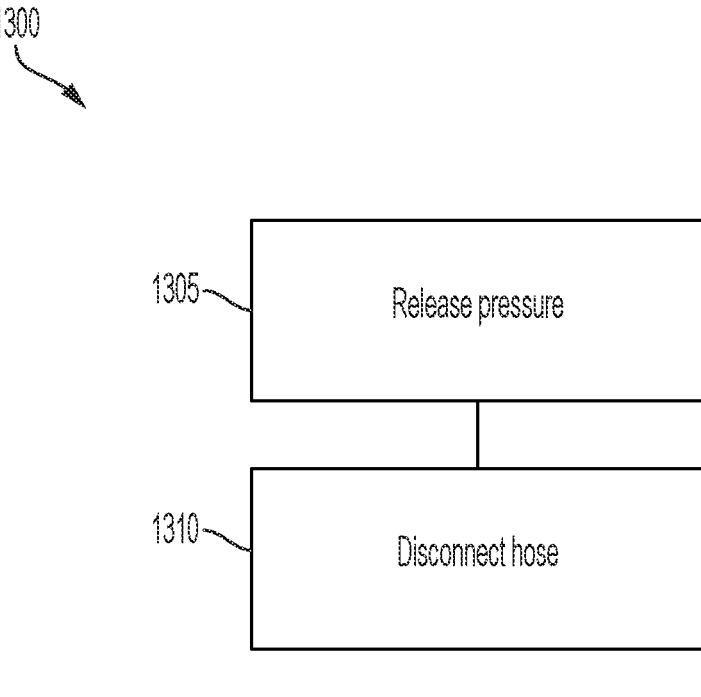
FIG. 13 depicts a flow diagram illustrating an example method to disconnect a hose from air access assembly, in accordance with some aspects.

FIG. 13 depicts a method 1300 for disconnecting a hose from an air access assembly. While the example herein refers to air access assembly 305, and components thereof, method 1300 can apply to any air access assembly disclosed herein (e.g., 105, 305, 1005, etc.). Method 1300 can include releasing a pressure (Act 1305) and disconnecting the hose (Act 1310). Act 1305 of releasing a pressure can include moving a push member 310 of an air access assembly 305. A movement of the push member 310 can include a linear movement in a first direction. For example, the push member 310 can move linearly along, or parallel with, the central axis 215 of the air access assembly 305 in the first direction. Act 1305 can include releasing a pressure applied to or provided to a hose that is coupled with the air access assembly 305. Releasing the pressure can include moving or activating a pressure release member 345 of a fitting 335 of the air access assembly 305.

Act 1310 of disconnecting the hose can include moving the push member 310. For example, the push member 310 can move linearly along, or parallel with, the central axis 215 of the air access assembly 305. The push member 310 can move in the first direction or a second direction. The second direction can be opposite the first direction. Act 1310 can include disconnecting the hose from the air access assembly 305.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of left and right, front and back/rear and top and bottom, among other variations may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a fluid access assembly, comprising:
  a first fluid access configured to pass first fluid with a first fluid pressure;
  a second fluid access configured to pass second fluid with a second fluid pressure, the first fluid pressure greater than the second fluid pressure, and the first fluid access concentric with the second fluid access; and
  a sensor to detect a type of hose connected to the fluid access assembly.

2. The apparatus of claim 1, comprising:
a control interface comprising:
  an interactive element to receive an input indicative of a user selection of a function of the fluid access assembly; and
  a display to provide a visual associated with the function selected.

3. The apparatus of claim 1, comprising:
a control interface to receive a user input indicative of a selection of a target pressure for an external object, the external object to receive the first fluid or the second fluid to reach the target pressure.

4. The apparatus of claim 1, comprising:
a control interface to provide a function based the type of hose detected, the function comprising at least one of switching a direction of fluid flow through the fluid access assembly between pushing fluid out and pulling fluid in and adjusting a target pressure for an external component that is to receive at least one of the first fluid and the second fluid.

5. The apparatus of claim 1, comprising:
a control interface disposed on a first side of the fluid access assembly; and
a water spout disposed on a second side of the fluid access assembly, the second side opposite the first side.

6. The apparatus of claim 1, wherein the fluid access assembly comprises:
  a first switch disposed radially outward from the second fluid access, the first switch to cause the second fluid to move in a first direction; and
  a second switch disposed radially outward from the second fluid access, the second switch to cause the second fluid to move in a second direction, the second direction opposite the first direction.

7. A method, comprising:
providing a fluid access assembly, the fluid access assembly comprising:
  a first fitting to pass first fluid with a first fluid pressure; and
  a second fitting to pass second fluid with a second fluid pressure, the first fluid pressure greater than the second fluid pressure, and the first fitting concentric with the second fitting;
wherein the fluid access assembly is configured to connect to a hose and a type of the hose is detectable by a sensor.

8. The method of claim 7, comprising:
providing a control interface, the control interface to receive a user input indicative of a selection of a target pressure for an external object, the external object to receive at least one of the first fluid and the second fluid to reach the target pressure.

9. The method of claim 7, comprising:
providing a control interface, the control interface comprising:
  an interactive element to receive an input indicative of a user selection of a function of the fluid access assembly; and
  a display to provide a visual associated with the function selected.

10. The method of claim 7, comprising:
disposing a control interface on a first side of the fluid access assembly; and
disposing a water spout on a second side of the fluid access assembly.

11. An electric vehicle, comprising:
a fluid control system, the fluid control system comprising:
  a fluid access assembly, comprising:
    a first fluid access configured to pass a first fluid with a first fluid pressure;
    a second fluid access configured to pass second fluid with a second fluid pressure, the first fluid pressure greater than the second fluid pressure, and the first fluid access concentric with the second fluid access; and
    a sensor to detect a type of hose connected to the fluid access assembly.

12. The electric vehicle of claim 11, comprising:
a control interface comprising:
  an interactive element to receive an input indicative of a user selection of a function of the fluid access assembly; and
  a display to provide a visual associated with the function selected; and
a water spout disposed adjacent to at least one of the fluid access assembly and the control interface.

* * * * *